INVENTOR.
ANTHONY E. WISNE
BY
Robert A. Sloman
ATTORNEY

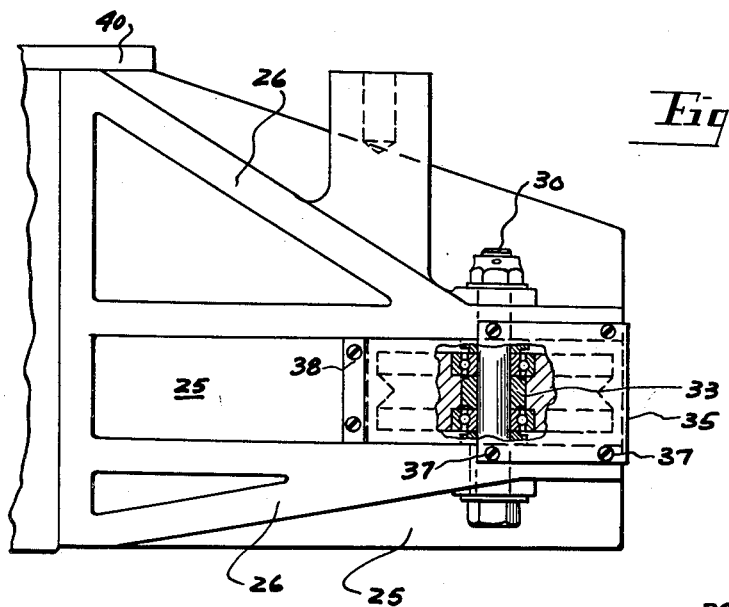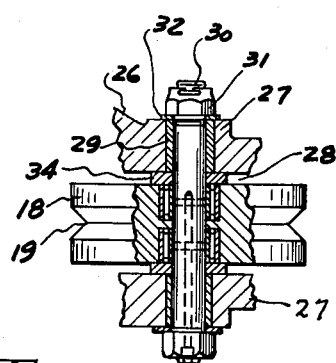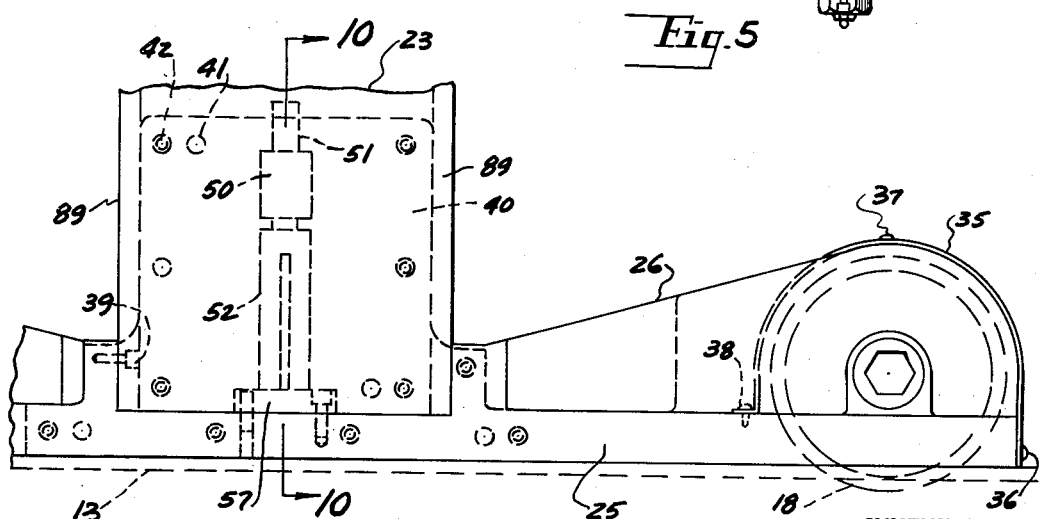

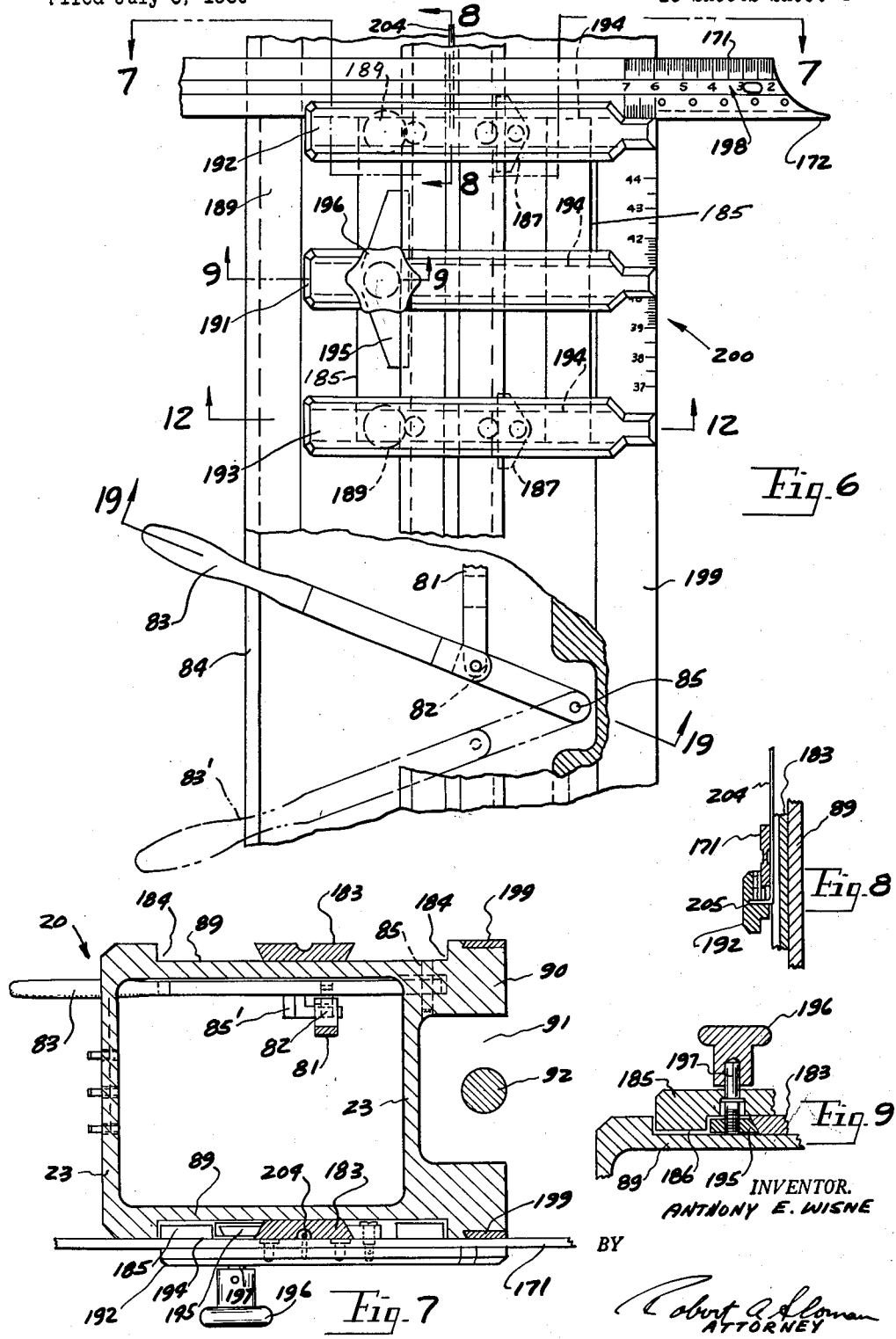

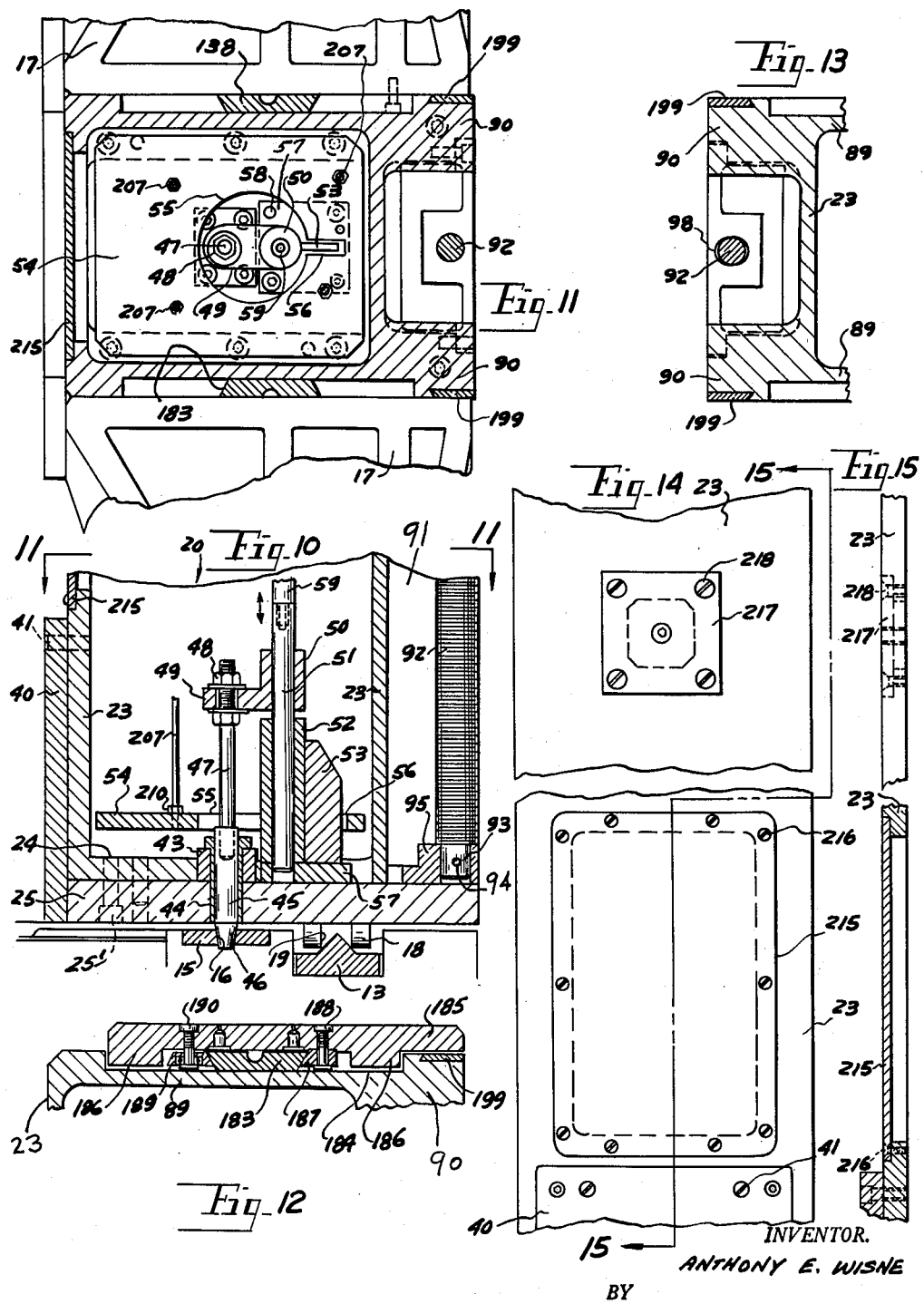

Nov. 26, 1963 A. E. WISNE 3,111,767
THREE-DIMENSIONAL CHECKING FIXTURE
Filed July 6, 1960 10 Sheets-Sheet 6
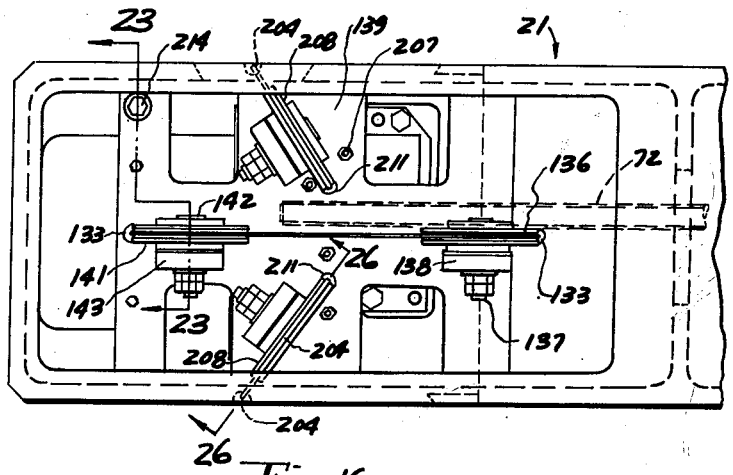
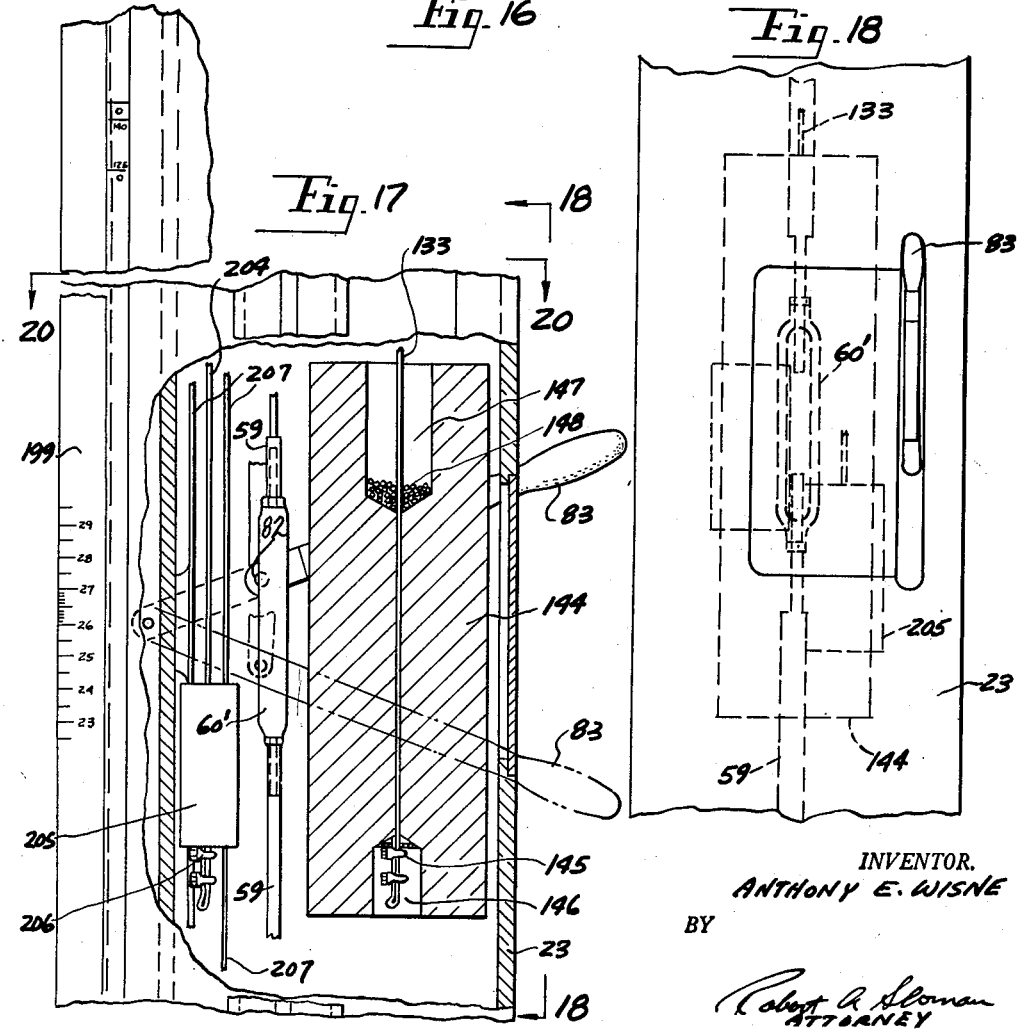
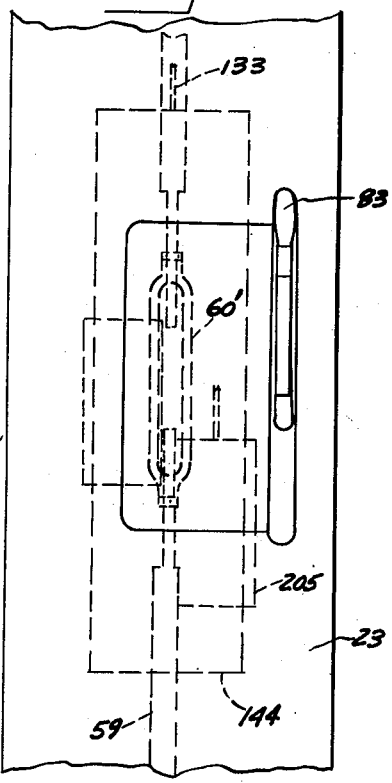
INVENTOR.
ANTHONY E. WISNE
BY
Robert A. Sloman
ATTORNEY Nov. 26, 1963 A. E. WISNE 3,111,767
THREE-DIMENSIONAL CHECKING FIXTURE
Filed July 6, 1960 10 Sheets-Sheet 7

INVENTOR.
ANTHONY E. WISNE
BY
Robert A. Sloman
ATTORNEY

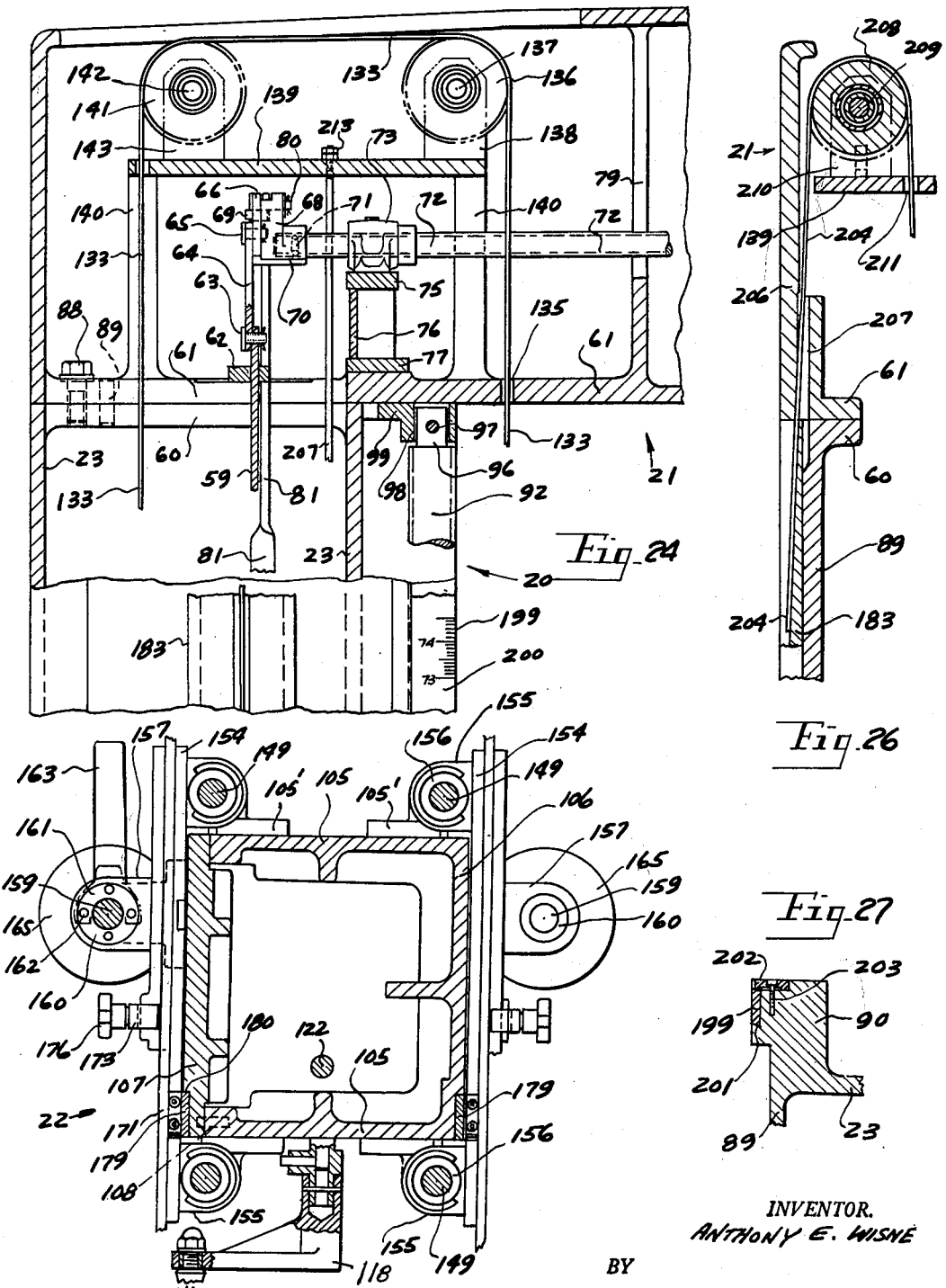

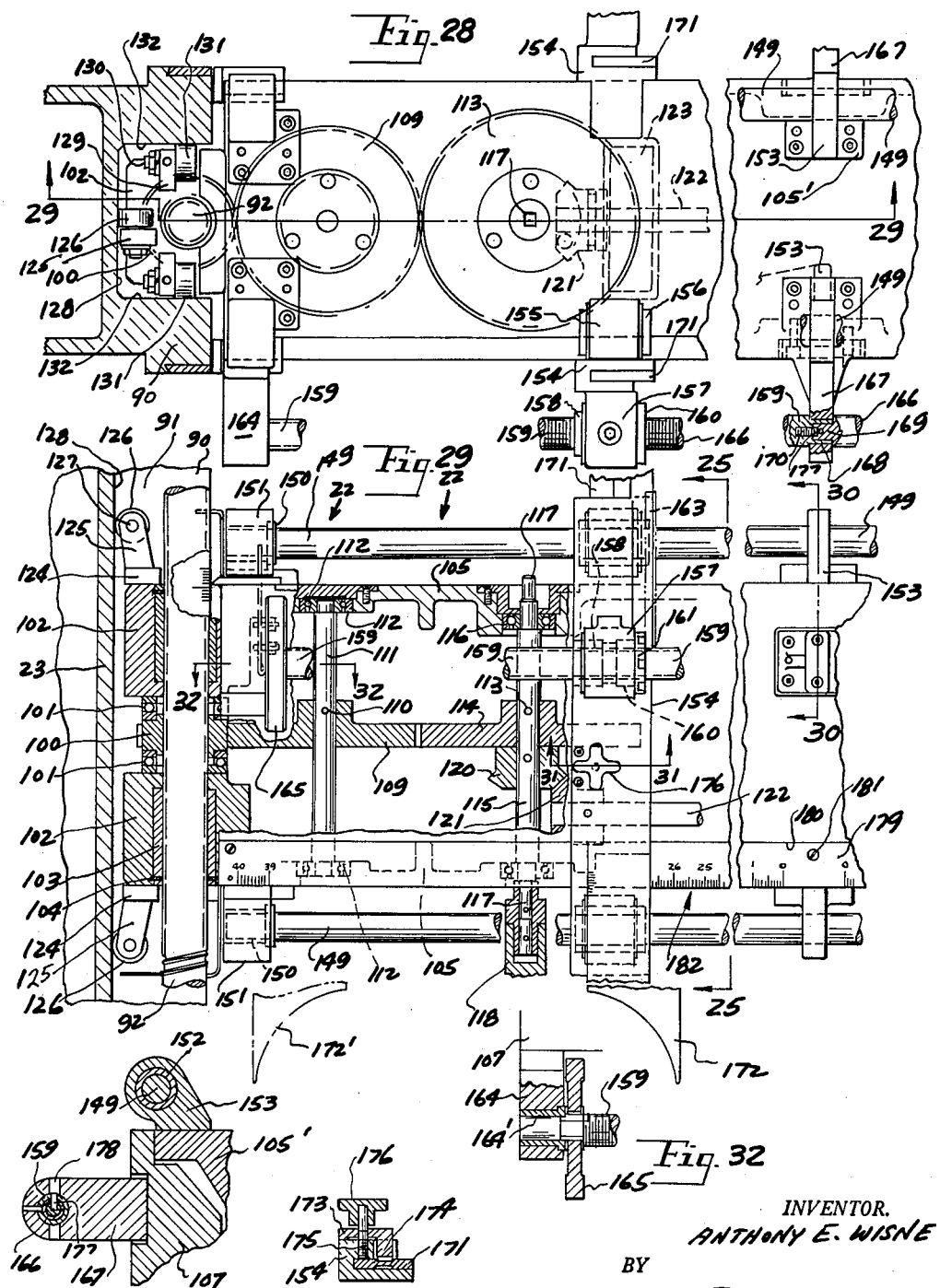

United States Patent Office 3,111,767
Patented Nov. 26, 1963

3,111,767
THREE-DIMENSIONAL CHECKING FIXTURE
Anthony E. Wisne, 8770 Linwood Ave.,
Dearborn 6, Mich.
Filed July 6, 1960, Ser. No. 41,078
18 Claims. (Cl. 33—174)

This invention relates to a styling bridge, and more particularly to a type of checking fixture for vehicles and the like.

Heretofore various types of checking fixtures have been employed, particularly in the production of vehicles for checking the accuracy of dimensions and locations of openings, uniformity and symmetry of construction particularly adapted for vehicles and wherein the vehicle is positioned directly below the checking fixture with the checking fixture being adapted for controlled longitudinal incremental movements throughout the length of the vehicle body and incorporating gaging elements for checking dimensions and locations throughout the entire surface of the vehicle and throughout its length.

It is another object of the present invention to provide a novel form of mounting for the styling bridge for effecting guided incremental longitudinal movements of the entire bridge over and with respect to a vehicle body throughout its length.

It is a further object to present in the present styling fixture for vehicle bodies a vertically adjustable horizontally disposed beam carrying measuring indicators together with means for effecting ease in the accurate control of the vertical adjustments of the beam and for counterbalancing the same.

It is another object to mount upon the said vertically adjustable beam horizontally adjustable scriber points or indicators which are adapted for movement in unison either away or towards each other under a single control as desired whereby oppositely arranged symmetrical points on upper portions of the vehicle body may be accurately checked.

It is another object of the present invention to provide an easily adjustable manual control for regulating vertical adjustments of the horizontally disposed beam of the styling bridge or fixture whereby the same may be elevated manually from either side of the machine and from either end thereof.

It is another object to provide within the supporting upright columns of the styling fixture vertically adjustable indicator mountings which are suitably counterbalanced for carrying indicator means for gaging lateral dimensions upon opposite sides of the vehicle body.

It is a still further object to provide completely redesigned styling bridge or checking fixture for vehicle bodies which provides for complete accuracy in the checking of critical dimensions in the locations of openings and symmetry in three dimensions.

The present styling bridge thus makes possible a means of verifying all critical dimensions and to ascertain that the same are being maintained in regular production of vehicles, for example. For example, in the surface plate checking operation of a vehicle body after the same has gone through a body check, it is placed upon a surface plate weighing approximately 6-tons. By using precision levelling body fixtures, master gages which check front end of body, including shroud and front body lines, and the styling bridge, an accurate check of dimensions may be made. This procedure insures that openings will be dimensionally accurate so that doors and decklids will have a neat appearance after installation.

It also makes for accurate windshield and back light openings for good fit of glass, rubber and trim moldings.

These and other objects of the present invention will be seen from the following specification and claims in conjunction with the appended drawings in which:

FIG. 3 is a fragmentary plan view partially broken away and sectioned, illustrating the wheel mounting for one of the carriers of the styling fixture.

FIG. 4 is a fragmentary side elevational view thereof.

FIG. 5 is a fragmentary plan section illustrating the wheel mounting for the other carrier of the styling fixture.

FIG. 6 is a fragmentary front elevational view on an enlarged scale of a lower portion in FIG. 1.

FIG. 7 is a fragmentary section taken on line 7—7 of FIG. 6.

FIG. 8 is a fragmentary section taken on line 8—8 of FIG. 6.

FIG. 9 is a fragmentary section taken on line 9—9 of FIG. 6.

FIG. 10 is a fragmentary section on an enlarged scale of a portion of FIG. 1.

FIG. 11 is a fragmentary section taken on line 11—11 of FIG. 10.

FIG. 12 is a fragmentary section taken on line 12—12 of FIG. 6.

FIG. 13 is a fragmentary section corresponding to FIG. 10 but from the opposite side of the checking fixture.

FIG. 14 is a fragmentary side elevational view of one of the columns of the present checking fixture.

FIG. 15 is a fragmentary section taken on line 15—15 of FIG. 14.

FIG. 16 is a fragmentary top plan view looking down on one of the columns of the checking fixture and a portion of the cross beam thereon.

FIG. 17 is a fragmentary longitudinal section corresponding to a portion of FIG. 1, but on an increased scale for clarity.

FIG. 18 is a side elevational view thereof taken on line 18—18 of FIG. 17.

FIG. 19 is a fragmentary section taken on line 19—19 of FIG. 6.

FIG. 20 is a section taken on line 20—20 of FIG. 17.

FIG. 21 is a fragmentary end elevational view portion of one of the supporting columns of the styling bridge.

FIG. 22 is a fragmentary section taken on line 22—22 of FIG. 20.

FIG. 23 is a fragmentary section taken on line 23—23 of FIG. 16.

FIG. 24 is a fragmentary section corresponding to a portion of FIG. 1 on an enlarged scale for clarity.

FIG. 25 is a fragmentary section taken on line 25—25 of FIG. 29.

FIG. 26 is a fragmentary section taken on line 26—26 of FIG. 16.

FIG. 27 is a fragmentary section taken on line 27—27 of FIG. 33, illustrating the scale mounting for one of the columns.

FIG. 28 is a fragmentary plan section of a portion of the vertically adjustable beam shown in inset 29 of FIG. 1.

FIG. 29 is a section taken on line 29—29 of FIG. 28.

FIG. 30 is a fragmentary section taken on line 30—30 of FIG. 29.

FIG. 31 is a fragmentary section taken on line 31—31 of FIG. 29.

FIG. 32 is a fragmentary section taken on line 32—32 of FIG. 29.

The above drawings illustrate merely one preferred embodiment of the invention, it being contemplated that other embodiments may be devised within the scope of the claims hereafter set forth.

Figure 1:
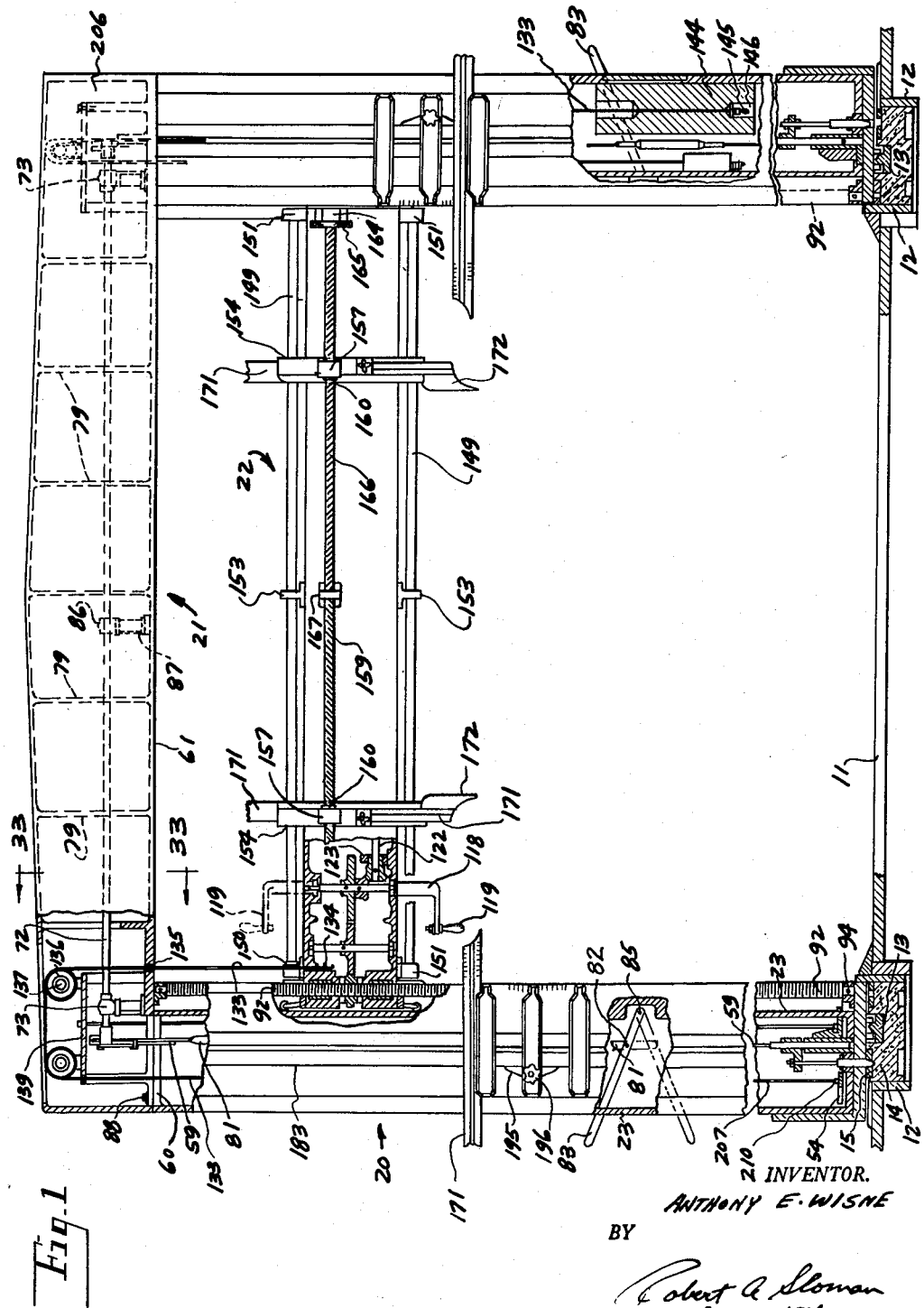
FIG. 1 is a fragmentarily partially broken away front elevational view of the present styling fixture.
Figure 2:
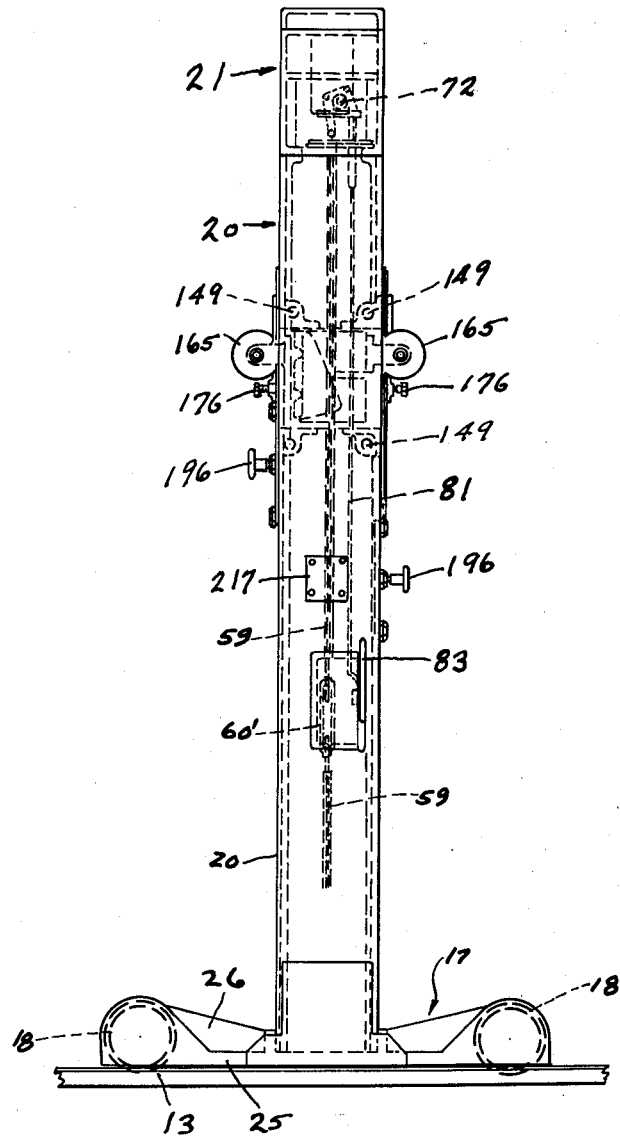
FIG. 2 is a side elevational view thereof.

Referring to the drawings, FIG. 1 is a front elevational view partially broken away and sectioned of the present gaging fixture particularly adapted for vehicle bodies or the like but not limited thereto, and FIG. 2 is a side elevational view thereof. Due to the size of the present structure which is adapted for gaging a vehicle, FIG. 1 shows therein a series of insets numbered 6, 10, 17, 24 and 29. There are provided in the drawings figures corresponding to each of these insets showing the parts on an enlarged scale for the purpose of clarity.

Referring to FIG. 1, there is shown a ground surface 11 which may be of steel plates which may form a portion of a floor of a building which is perfectly horizontal. Pairs of upright channels 12 are projected down into the floor 11 in parallel spaced relation in order to supportedly mount therein the elongated formed tracks 13 which are embedded in the cement 14 or other material within the respective channels 12 to thus define a pair of parallel spaced elongated trackways upon which the present gaging fixture or styling bridge is movably mounted and supported.

Also mounted within each of the channels 12 upon the supporting material 14 therein are the respective control strips 15 by which as hereafter described the fixture is limited to longitudinal incremental movements, as desired, for gaging the entire longitudinal surface of the vehicle body or other objects being checked.

For this purpose, each of the elongated metallic bars 15 have formed therethrough a series of spaced tapered apertures as shown at 16 in FIG. 10, which in the preferred embodiment are spaced apart a distance of one-inch between centers. This means the gaging fixture is moved along the track 13 shown in FIG. 10 and a positive stop is provided in view of the tapered plunger 45—46 under manual control as hereafter described, which serves to lock the checking fixture with respect to the control rail 15 throughout the longitudinal traverse of said fixture with respect to the object being checked. Thus there is provided a means for incrementally checking the entire length of the object being gaged as will become more apparent in the following description.

As shown in FIG. 2, being a side elevational view of the present fixture, there is provided at the lower ends of each of the upright supporting columns 20 the carriers generally indicated at 17 mounting the longitudinally spaced wheels 18 which are movably positioned upon the respective elongated inverted V-shaped portions of the tracks 13 upon the floor or ground surface. As shown in FIG. 10 the respective wheels have annular central grooves 19 to cooperatively engage the track 13.

The fixture as now generally described includes above the respective carriers 17 the upright hollow standards 20 which at their upper ends are bridged by the top beam 21, FIG. 1, which is suitably secured thereover and thereto at its opposite ends completing the inverted U-shaped structure. As hereafter described there is also provided a vertically adjustable support or beam 22 mounted upon the respective uprights 20 at its opposite ends together with manual means for effecting easy raising and lowering of said beam with respect to the end supports 20, said beam being suitably counterbalanced as hereafter described.

Carrier Assembly for Styling Bridge Standards

Referring to FIGS. 1, 2, 3, 4, 5, and 10, the present gaging fixture or styling bridge includes a pair of upright hollow standards 20 of substantially rectangular cross section horizontally, including the upright opposed spaced side walls 23 and the opposed end walls 89 shown in FIG. 7.

The said standards 20 are preferably of cast aluminum construction, for illustration, and include the transverse bottom wall 24, FIG. 10, and horizontally disposed and secured thereunder the transversely elongated bottom support plate 25 joined thereto as by fasteners 25' and associated dowels as shown in FIG. 10. The said support plate 25 projects forwardly and rearwardly respectively of the upright standard 20 as best shown in FIGS. 3 and 4, there being a suitable reinforcing webbing 26 extending outwardly from the said standard towards and to the outer ends respectively of the mounting plate 25 to thus provide for the mounting of the aligned pair of wheels 18 for mounting upon the track 13.

As shown in FIG. 5, which is a fragmentary section of the wheel mounting of the left-hand carrier for illustration, FIG. 1, the said framework 26 includes towards its outer end spaced hubs 27, spaced as at 28 carrying bushings 29 to support the wheel stud 30, which is fixedly secured transversely through and upon the bosses 27 by the bolts 31 with suitable end thrust washers 32 interposed.

FIG. 3 illustrates merely a slightly different form of wheel mounting for the right-hand carrier shown in FIG. 1 and wherein a suitable bearing assembly 33 is positioned around the stud 30. End thrust discs 34, FIG. 5 are interposed between the bosses 27 and the respective channel type wheel 18 for spacing the same.

The formed cover 35 extends over the respective central portions of the webbing 26 and over around the wheel mountings and is secured at one end of the support plate 25 by the fasteners 36. Upper portions of the cover 35 are secured to portions of the webbing 26 as at points 37. The wheel cover also extends downwardly in the form of a substantially semi-circle and is secured to the base plate 25 by the fasteners 38 as shown in FIGS. 3 and 4.

This type of assembly is employed for the respective mounting of the front and rear wheels in longitudinal alignment for each of the respective carriers of the styling or checking fixture shown in FIG. 1. In each case the respective wheels 18 are annularly grooved at 19 so as to cooperatively engage over the inverted V-shaped tracks 13, best illustrated in FIGS. 1 and 10. Accordingly there is provided a trackway and proper mounting for the carriers at the lower ends of the standards 20 which form a part of the checking fixture by which the said fixture may be moved longitudinally over the ground surface in a predetermined path.

As shown in FIG. 4 the respective side plates 89 of the columns 20 are projected down into the central upright portion of plates 25 and fixedly secured thereto as by the fasteners 39. Likewise, the lower ends of the respective columns 20 are fixedly provisioned within portions of the carrier plates 25 to form a rigid unit. Reinforcing plate 40 is mounted over and across the lower end of the outer of the side plates 23 as shown in FIG. 10 and secured thereto by the dowels 41 and fasteners 42, as shown also in FIG. 4.

Feed Control Mechanism

The present styling fixture is adapted for longitudinal incremental movements along the parallel spaced tracks 13 in the ground surface and means are incorporated under the control of the operator for limiting the movement of the carrier to short incremental movements in view of the series of longitudinally spaced tapered apertures 16 formed in the control plates 15 which extend parallel and adjacent to the respective tracks 13.

For this purpose, the sleeve 43 in FIG. 10 disposed in bottom plate 24 mounts the bushing 44 which extends therethrough and down through carrier plate 25 so as to slidably receive the vertically adjustable pin 45 and whose tapered lower end 46 is adapted for cooperative projection within the corresponding one of a plurality of longitudinally spaced apertures 16 in the control plate 15. Shaft 47 joined to the pin 45 at its lower end projects up through the holder arm 49 on the sleeve 50 and is secured thereto by the bolts and associated washers 48.

The vertically movable rod 51 is snugly projected through the sleeve 50 and slidably extends through the upright bushing 52 with its associated supporting flange 53 both mounted upon the plate 57 suitably secured as by fasteners 58, FIG. 11 to the carrier plate 25. The plate 57 has an aperture 56 corresponding to the sleeve 52 through which the guide rod 51 slidably extends.

The vertically movable control rod 59 is joined at its lower end to guide rod 51, as shown in FIGS. 2 and 10, which incorporates a suitable turn buckle 60' therein. The upper end of the rod 59 projects up through the top wall 60 of the standard 20 and through the slotted guide 62 mounted upon the bottom wall 61 within the transverse beam 21. The upper end of the rod 59 is pivotally connected at 63 to the link 64 whose upper end is pivotally connected at 65 to the rocker plate 66, FIG. 24.

Figure 33:
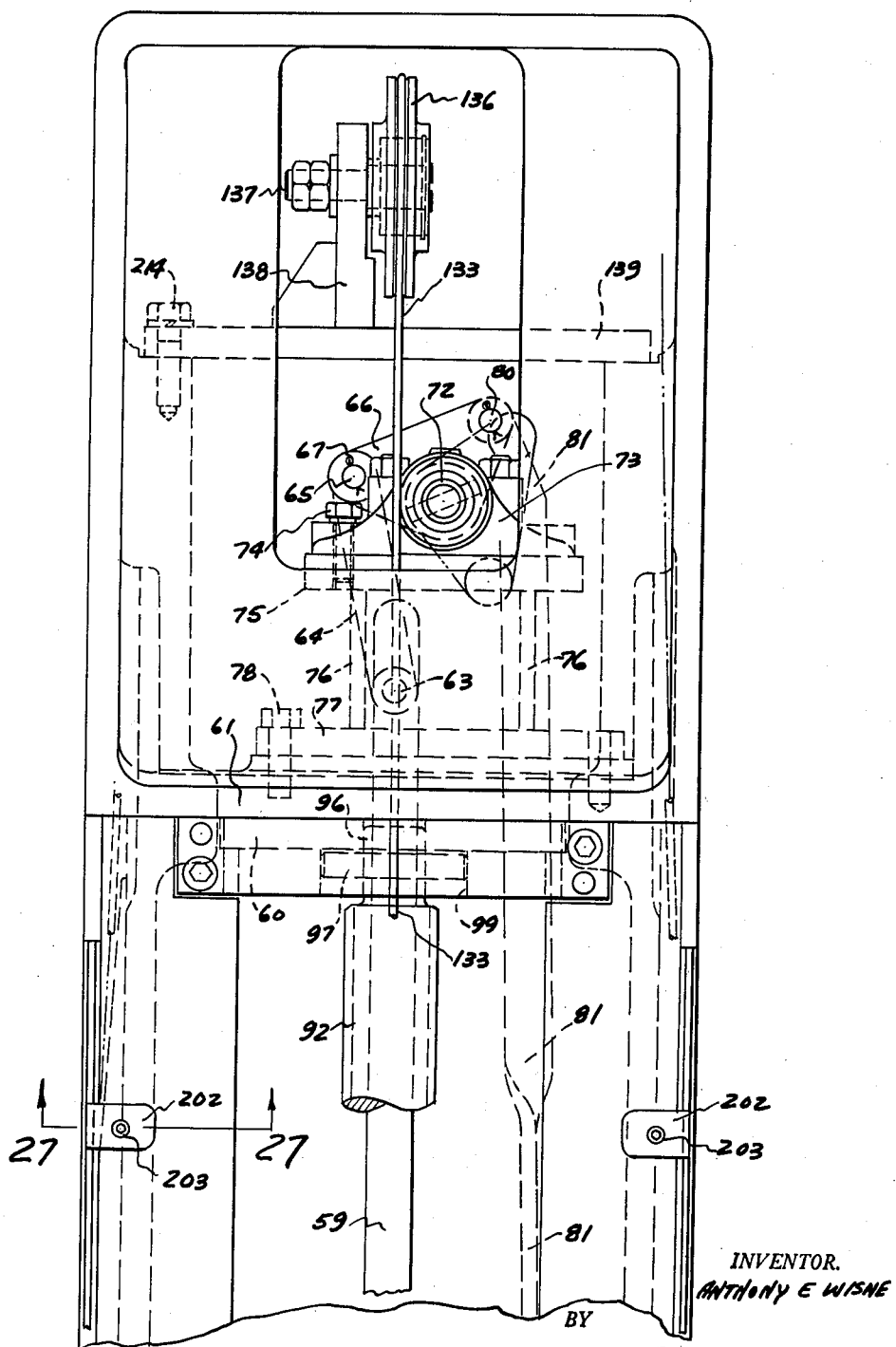
FIG. 33 is a section taken on line 33—33 of FIG. 1 on an increased scale.

This construction is also illustrated in FIG. 33 wherein the pivot 65 is retained with respect to the rock plate 66 by the cotter pin 67. The rock plate 66 is joined as at 69, FIG. 24 to the arm 68 which has a collar 70 into which projects the rotatable shaft 72 keyed thereto as at 71. The said shaft 72 extends all the way across and through the hollow horizontal top beam 21 and is journaled within the pillow blocks 73 mounted on the support 75—76, secured at 77 to the bottom wall 61 of the top beam 21.

The control rod 81 is pivotally connected to the rock arm 68 as at pivot point 80, shown in FIG. 33 as well as in FIG. 24. The said arm 81 extends downwardly and at its lower end is pivotally connected at 82 to an intermediate portion of the manual control arm 83. This arm itself projects through the slot 84 in the side wall 23 of the standard 20, which arm is pivotally mounted to the said standard as at point 85. Accordingly, the manual control arm 83 projects outwardly of the upright column 20 and provides a means for effecting vertical control movement of the control rod 59 in turn connected with guide rod 51 joining the locking pin 45, operating through the rockable members 66 and 68 shown in FIGS. 24 and 33. When the arm 83, shown in FIG. 6, is in the solid line uppermost position shown, of course the control arm 51 is in its lowermost position, which means that the locking pin 45 is nested within one of a series of longitudinally spaced apertures 16 in the control strip 15. This functions to restrain the carrier against any movement upon the track 13 during a particular checking operation.

An assembly, similar to what has been above described with respect to the left hand column 20 of FIG. 1, is also found in the right hand column for operation in exactly the same manner. The same control mechanism is employed and there is as shown in FIG. 1 a corresponding locking pin under the control of a separate control arm 83. However, the top shaft 72, which extends through the top beam 21 is connected to the corresponding rocking members 66 and 68 so that either one of the handles 83 from either of the columns 20 may be activated in order to effect simultaneous release movement of the corresponding locking pins 45 in each of the said columns.

FIG. 6 also shows the dotted line release position of one of the control handles 83 which correspond to a position of the locking pins out of contact with the control strip 15.

Accordingly as the styling bridge is moved on the track 13 it may be moved a short distance equal to the spacing between the apertures in the control strip 15 after which the arm may be activated so as to relock the styling bridge or checking fixture for the next checking operation. When one arm 83 is activated, in view of the interconnection between the two, as shown in FIG. 1, the second arm will be likewise automatically actuated so that both pins are engaged or disengaged simultaneously.

As shown in FIGS. 7 and 21 the control arm 83 in its lowermost dotted line position as shown in FIG. 6 comes to rest upon the stop 85'. It is noted that the right hand column shown in FIG. 1 also has a similar control arm 83 the operation of which is exactly the same as the first described control arm 83 mounted upon the left hand column, FIG. 1.

In connection with the operation of the gage device herein described, and as shown in FIG. 10, adjacent the guide mechanism which limits and retains the fixture for control of longitudinal movements with respect to track 13, there is provided a floating plate 54 which receives the lower ends of certain guide rods such as the guide rod 207 connected at its lower end as at 210 for the purpose hereafter described. As shown however in FIG. 10 the said plate has a transverse recess 55 therethrough adapted to extend around and loosely receive, rod assembly 47, guide bushing 52 and the support member 53. The plate 54 has a narrow slot 56 as best shown in FIG. 11 to loosely receive the upright support plate 53 joined to the guide bushing 52.

As above described, manual pivotal movements of the arm 83 in the column 20 cause raising and lowering movements of the locking pin 45 shown in FIG. 10. As above described, such raising and lowering movements of the arm 83 are adapted to effect simultaneous raising and lowering movement of another locking pin 45 carried within the right hand column shown in FIG. 1. The rock plate 66 and associated member 68 has its center upon the transverse horizontally disposed shaft 72 which is journaled within the pillow blocks 73–75. This same shaft 72 extends longitudinally through a central portion of the top beam 21 and intermediate its ends is supported and journaled within the additional pillow block 86 secured at 87 within the top beam as shown in FIG. 1.

The opposite end of the shaft 72 is joined to another assembly similar to that shown at 66–68–69–70–71 in FIG. 24.

The transverse top beam 21 is a cast member, preferably of aluminum or the like, and includes a series of parallel spaced reinforcing webs 79, and with the respective opposite ends of the said beam 21 overlying upper ends of the respective columns 20 and secured thereto as by the bolts 88 and dowels 89, FIGS. 1 and 24.

Each of the respective upright columns 20 have integral with their inner upright walls the upright column portions 90 as in FIGS. 11 and 13. Each column on its opposite sides includes a pair of said elements 90 to define an upright rectangular space 91, FIG. 7, within which is centrally positioned within each of the said columns respectively the upright stationary elongated threaded shaft or screw 92.

*Vertically Adjustable Cross Beam and Control Therefor*

The screw for the left hand column is indicated at 92 in FIGS. 1, 11, 12 and FIG. 7, for illustration, whereas the corresponding upright stationary control screw 92 for the right hand column is indicated in FIGS. 1, 13 and 20.

As shown in FIGS. 1 and 10 the lower ends of each of the screws 92 are reduced as at 93 and are secured by the transverse pins 94 within the block 95 secured to support plate 25. The upper end of the said screw as shown in FIG. 24 is reduced at 96 and is loosely positioned within the laterally elongated recess 98 within the inner corner portion 99 at the upper end of the column 20, and is transversely secured thereto by the pin 97. The lateral elongation of the opening 98 is further shown in FIG. 13. The purpose of this elongation is to permit a limited amount of transverse flexing movement of the screw or shaft 92 when in operation.

The vertically adjustable beam 22 of FIG. 1 is positioned horizontally between the upright standards 20 and is adapted for vertical adjustment therebetween with respective opposite ends of the vertically adjustable beam 22 movably mounted and directly connected with the respective screws 92 in the respective upright columns 20.

The mounting includes, as particularly shown, in FIGS. 28 and 29, the pinion 100, which is movably threaded upon the respective shaft 92 and adapted for longitudinal movement thereover upon rotation of the said pinion, as hereafter described. Thrust bearings 101 are arranged above and below the said pinion and respectively engage the end blocks 102 which are suitably secured to the respective end portions of the vertically adjustable beam 22. Each of the blocks 102 carries a sleeve or bushing 103 retained therein by the locking rings 104 so as to cooperatively and slidably receive the stationary screw 92.

Idler pinion 109 secured at 110, upon the upright rotatable shaft 111 is enmeshed with the pinion 100. The respective and upper and lower ends of shaft 111 are journaled within the end thrust bearings 112 as best illustrated in FIG. 29. Manually rotatable gear 114 secured at 113 upon upright shaft 115 journaled at 116, is at all time in mesh with the idler gear 109 for controlling rotation of the control pinion 100 for affecting raising and lowering of the transverse beam 22.

The handle 118, best shown in FIGS. 1 and 25 has a socket end, preferably of square interior cross section so as to cooperatively project over the lower similarly shaped end extension on the lower end of the shaft 115 as at 117 providing means for affecting rotation of the gear 114. The socket end 118 of said handle may be interchanged as desired so as to set over the upper end 117 of shaft 115, as shown in FIG. 29.

As above described, the beam 22 has a similar control pinion 100 at its opposite end which operably engages the stationary upright corresponding threaded shaft 92 for the right hand standard as shown in FIG. 20, for illustration. Though, not shown in the drawing, there is a similar structure, as above described in connection with FIGS. 1, 25 and 29, whereby the right hand pinion 100 may be similarly controlled by a handle similar to handle 118—119. Accordingly the beam 22 may be raised or lowered from either end or from the top or bottom thereof.

Referring again to FIG. 29, the manually rotative shaft 115 has also secured thereunder the bevel pinion 120 which is enmeshed with a corresponding pinion 121 secured to a horizontally disposed shaft 122 journaled at 123, FIG. 1 by which manual rotation of shaft 115 through the handle 118—119 will cause a simultaneous automatic rotation of a corresponding shaft 115 at the right-hand end of the column 22, not shown in the drawing. This means that manually rotation of shaft 115 causing control vertical adjustments of the beam 22 by the action of the pinion 100, effects a simultaneous rotation of the second pinion 100 at the opposite end of the beam so that the beam rises smoothly with respect to the columns between which it is positioned. By the same token, the control handle 118—119 may be used at the opposite end of the beam and achieve the same results.

The said beam 22 is again of a cast aluminum construction and includes the top and bottom plates 105, FIG. 29. Additionally, as best illustrated in FIG. 28, mounted upon the respective blocks 102 by the additional outwardly and angularly inclined supporting arms 125 are rollers 126 which engage bearing surface 128, being journaled at their outer ends as at 127. The additional oppositely arranged rollers 131 are adapted to cooperatively engage the interior upright surfaces 132 upon the interior of the respective columns 20, as best seen in FIG. 28. It is noted that from FIGS. 28 and 29 that the three rollers 126, 131 are duplicated above and below the blocks 102 and furthermore that a similar type of assembly is arranged at the right hand end of the vertically adjustable beam 22 with respect to the right hand column, which is similarly formed as particularly shown in FIG. 13.

This arrangement of the guide rollers assures a smooth, controlled upward adjustment of the beam 22 with a minimum of friction.

This action is furthermore facilitated by the fact that the horizontally disposed beam 22 is effectively counterbalanced. For this purpose and arranged adjacent opposite ends of the said beam 22 at its top as shown particularly in FIG. 1, as well as FIG. 24, the cable 133 projects down into the said beam 22 and is fixedly secured to the upper block 102 by the fasteners 134. The said cable extends upwardly through aperture 135 in the top beam 21 and around the first pulley 136 journaled at 137 upon the upright support 138, FIG. 24, which is mounted upon the horizontal plate 139 upon standard 140 within the top beam 21. The cable 133 extends over a second pulley 141 journaled at 142 upon the upright 143 also mounted upon support plate 139. The cable continues downwardly from pulley 141 and projects into the interior of the respective column 20 adjament its outer edges, and as best shown in FIG. 17, extends centrally through an elongated weight 144 which is preferably square in cross section, and is secured at 145 within the lower recess 146 formed in the undersurface of the weight.

The cable 133 extends through an additional recess 147 at the upper end of the weight 144 and wherein a plurality of lead shot 148 are loosely provisioned in order to complete the necessary counterbalancing for the horizontally disposed vertically adjustable beam 22. It is understood, of course, that there is a similar weight 144 within the left hand column joined to cable 133 shown in FIG. 1.

*Scale Carrier Assembly on Vertically Adjustable Beam*

As shown in FIG. 1, there are provided upon the vertically adjustable beam 22 a pair of upright spaced scale carriers 154 together with means for effecting, if desired, simultaneous inward and outward adjustment of the said scale carriers with respect to the said beam 22. For this purpose and as best illustrated in FIG. 25 there are provided adjacent and above the top outer edges of the beam 22 a pair of elongated guide rods 149, and a similar spaced pair of corresponding guide rods 149 are arranged adjacent the under surface of the beam 22 at its forward and rear edges.

At the respective outer ends of the beam, the guide rods 149 are nested within bushings 150 positioned within the supports 151 suitably secured to end portions of the vertically adjustable beam 22 upon its top surface as well as upon its under surface, as shown in FIG. 29, for example. Central portions of the respective guide rods 149 extend through the bushings 152 on the centrally arranged formed arms 153 mounted upon the top and bottom of the beam 22 adjacent its opposite marginal edges to thus provide an intermediate support for the respective guide rods, FIG. 30.

The scale carrier plates 154, of which there are two as shown in FIG. 1, are arranged in an upright position, as shown in FIG. 25 and are also arranged upon opposite sides of the beam 22. The said carriers 154 have projected inwardly from their upper and lower ends respectively the apertured bosses 155 mounting suitable bushings 156 which slidably and cooperatively engage around the respective guide rods 149 as best illustrated in FIG. 25. Thus there are provided suitable mountings for the upright scale carriers 154 for guiding their longitudinal in and out adjustments with respect to the beam 22, maintaining the same in an upright position. Suitable means are employed for effecting manual control in and out movements of the said scale carriers. For this purpose there is provided, projecting outwardly from an intermediate portion of each of the said scale carriers the boss 157, which mounts the stationary nut 158 through which is threaded the rotatable control screw 159. Said screw also receives the manually adjustable interiorly threaded nut 160 also mounted within the carrier boss 157.

The spanner type of hand wrench 161 is secured to an end portion of the rotatively adjustable nut 160 as at points 162, FIG. 25 and includes the operating handle 163 whereby the slack may be taken up in the assembly of the respective nuts 158 and 160 within the boss 157 of each of the scribe carriers 154.

The outer end of the rotative threaded shaft 159 is journaled within a suitable bushing 164' within the boss 164 carried upon corresponding end portions of the side plate 107 or the opposing plate 106, as particularly shown in FIG. 32. A suitable hand wheel 165 is keyed to the shaft 159 and arranged adjacent the boss 164 providing a convenient means for rotating the threaded shaft 159.

As particularly shown in FIG. 1, there is provided a second threaded shaft 166 in axial alignment with shaft 159 but of an opposite hand of thread as shown. This threaded shaft is similarly mounted with respect to the right-hand scribe carrier 154, as above described, particularly with respect to FIGS. 25 and 29 and which is similarly journaled at its outer end within an assembly in the end of the beam 22 similar to that shown in FIG. 32 and which also includes a knurled hand wheel 165 whereby the said shaft 166 may be rotated as desired.

In the present preferred embodiment of the invention the respective shafts 159-166 are adapted for rotation in unison. For this purpose they are connected together at their inner ends as indicated at 167, FIG. 1. The method of interconnection is best illustrated in FIG. 28 at the right end thereof as well as in FIG. 30. The outwardly extending support 167 secured to a central portion of the beam 22 journals the sleeve extension 168 upon the outer end of the shaft 159. The said sleeve 168 receives a reduced shank 169 upon the corresponding end of the oppositely threaded shaft 166. It appears also that a threaded stud 170 threadedly interconnects the corresponding end portions of the two shafts 159 and 166. There is also provided a transverse pin 177 best illustrated in FIG. 30 which is adapted for registry with the upright slots 178 in the arm 167 to facilitate its removal, if desired.

This provides a means whereby the shafts 159 and 166 may be rotated in unison from either end of the beam 22 through the manual activation of either of the hand wheels 165. Inasmuch as the shafts 159 and 166 are oppositely threaded, it appears that rotation of either of the hand wheels 165 will effect a simultaneous and equal inward or outward movement of the two carriers 154 with respect to each other.

FIG. 31, being a section on line 31—31 of FIG. 29, illustrates the mounting of the respective scale 171 upon the corresponding carrier 154. Here it is seen that the scale 171 with formed pointer 172 at its lower end is secured with respect to the said carrier by the right angular hold down clamp 173 whose inwardly directed arm 174 operatively engages an outer wall portion of the said scale 171, and is secured thereto by the hand screw 176 which is threaded into the carrier 154.

Accordingly upon loosening of the hand screw 176 as at 175, the scale 171 may be raised or lowered as desired with respect to the carrier 154 and thereafter effectively secured in a desired position.

Though merely a pair of scale carriers are shown at 154 in FIG. 1, it appears from FIG. 25 there are a corresponding pair of scale carriers 154 arranged from the opposite side of the beam 22 and are mounted and adjusted in the same manner as above described with respect to the first mentioned scale carriers 154 shown in FIG. 1.

Also mounted upon the said beam 22 adjacent its lower edge upon its opposite sides are the horizontally elongated scales 179 within the undercut recesses 180 and secured to the respective plates 106 and 107 by the fasteners 181 shown in FIG. 29. Each of the scales 179 is preferably measured off with suitable indicia such as the inch markings indicated 182 in FIG. 29, for illustration.

*Scale Carrier Assemblies for the Upright Columns*

Mounted upon each of the upright columns 20 shown in FIG. 1, FIG. 2, as well as FIG. 6, being an enlarged view of the inset marked 6 on FIG. 1, are the vertically adjustable scale carriers 192—191—193. Upon opposite sides of each of the column assemblies 20 corresponding to the respective plates 89 thereof are the oppositely arranged upright dovetail guides 183 as best illustrated, for example in FIG. 7. The said tapered guides 183 are positioned within cutaway portions 184 upon opposite sides of the respective columns 20. The upright support plate 185, FIG. 12 includes the inward projections 186 which extend within the cutaway portions 184 of the said plates 89 of the respective columns.

Each of the respective plates 185 have secured upon their interior surfaces the upright gibs 187 secured thereto at 188 for cooperating retaining engagement with one side of the dovetail supports 183. Tapered rollers 189 are secured at 190 in spaced relation to the gibs 187 so as to cooperatively and retainingly and movably engage the opposite side portions of the guide 183 by which the said vertically adjustable scale holders 185 are movably mounted upon the respective columns 20 upon their opposite sides.

Mounted upon the outer surface of the plate 185 are a plurality of upright scale holders 191—192—193 which are normally spaced outwardly of the outer surface of the vertically adjustable plate 185 to define the horizontally disposed grooves or slots 194 within one of which slots a horizontally disposed scale 171 is positioned as best shown in FIG. 6 including the pointer 172 at its outer end. The said scale 171 is loosely positioned within the top holder plate 192 as shown in FIG. 6, and may be longitudinally adjusted within the groove 194 and easily removed therefrom for positioning, as desired, within corresponding slots defined by the other scale holder plates 191 and 193 respectively.

The said scale 171 also includes suitable indicia 198 measured in inches or other components so as to accurately position the said scale 171 with respect to the inner upright edge of the column 20. This assembly is also illustrated in FIG. 21 and shows the scale 171 positioned within the top scale holder plate 192.

As shown in FIG. 6, the mounting of the scale carrier 185 is achieved by the vertically spaced tapered rollers 189 shown in FIG. 6 as well as the corresponding vertically spaced gibs 187 shown in FIG. 12 and in FIG. 6.

There is also means provided for fixedly securing the scale carrier plate 185 with respect to the dovetailed guide 183. For this purpose and as shown in FIGS. 6 and 7 there is mounted a tapered gib 195 which is arranged rearwardly of the central scale carrier plate 191 for operative engagement with the dovetail guide 183. This said gib is threadedly engaged by the shaft 197 on the handle 196, and accordingly upon vertical adjustment of the carrier 185 to the desired position the handle 196 may be tightened for drawing up the gib 195 with respect to the guide 183 thus effectively securing the carrier 185 in vertically adjusted position upon the column 20.

In order to determine the vertical adjustment desired or to be measured by the scales 171 there are provisioned upon the said columns upon their opposite sides at their inner edges the upright scales 199.

FIG. 27 is a section taken on line 27—27 of FIG. 33, being on an enlarged scale and indicating the specific mounting of the said upright scales 199 with respect to the undercut grooves 201 formed within the upright edges of the column portions 99. The scales 199 and including their indicia 200, FIG. 6 are fixedly retained upon the said column elements 90 by the holddown plates 202 and the fasteners 203 which project into the right angularly related slot in the column element 90, as best illustrated in FIG. 27.

The scales 199 are of course arranged upon opposite sides of the column 20 for cooperation with corresponding right angularly related scales 171 carried upon the vertically adjustable carriers 185 arranged upon opposite sides of each of the columns 20. This same arrangement of course, is provided for both of the columns 20, as shown in FIG. 1.

The scale plate carriers 185 are also counterbalanced for ease of adjustment with respect to the columns 20. For this purpose the cable 204 in each case at its lower end, as shown in FIG. 8, extends along a groove in the outer portion of the dovetail support 183 and extends into and is secured as at 205 to a central portion of the uppermost scale mounting plate 192. The cable 204 extends upwardly along the length of the dovetail support 183 and at the upper end of the column 20 extends gradually inward through an upright groove 207, FIG. 26, formed within the cast portion of the transverse top beam 21, adjacent its corresponding wall 206 or 207, as the case may be.

The cable 204 extends through the hollow interior portion of the top beam 21 and around the angularly arranged pulley 208 journaled at 209 on the support 210 mounted on the horizontally disposed plate 139 shown in FIG. 24, and previously described as the mounting plate for the corresponding pulleys 136, 141 for the vertically adjustable beam counterbalancing system. As particularly shown in FIG. 16, being a top view of the upwardly opening top beam 21, there are arranged upon opposite sides of the assembly the angularly related and angularly positioned pulleys 208, one pulley for each of the corresponding vertically adjustable scale carriers 185 upon opposite sides of the column 20.

The cable 204 extends over and around the pulley 208 and down through an opening 211 in plate 139 and downwardly into the interior of the column 20. The respective cables 204 corresponding to each of the carriers 185 upon opposite sides of the said column extend through central openings in the upright weights 205 and directly therebelow are secured thereto by the fasteners 206 as best illustrated in FIG. 22. A pair of upright guide rods 207 slidably extend through bushings 208 upon opposite sides of the weights 205 and at their upper and lower ends as well as through enlarged longitudinal apertures 209 in the said weights.

The lower ends of the guide rods 207 are secured as shown in FIG. 1 to the floating plate 54 as at 210, as best illustrated in FIG. 10. The upper ends of the said guide rods 207 extend up through the horizontal plate 139, FIG. 23, and are fixedly secured thereto as by the fasteners 213.

As shown in FIG. 19, as well as in FIG. 22, there are provided pairs of upwardly opening grooves 211 in the said weights 205 into which may be positioned the desired amounts of lead shot 212 for equalizing the counterbalances for the most efficient operation thereof.

Accordingly with the hand screws 196 loosened on the carriers 185, the said carrier plates 185 are adapted for vertical adjustment with the greatest of ease in view of the counterbalancing assembly above described. As shown in FIGS. 16 and 23, the said plate 139 which mounts the respective pulleys 136–141 and pulleys 208 is secured upon the support bosses 140 within the top beam by the holddown fasteners 214.

Referring to FIGS. 14, 15 as well as FIG. 1, access to the interior of the respective columns 20 adjacent their lower ends is achieved by the removable plate 215 mounted upon the outer wall 23 and removably secured thereto by the fasteners 216.

There is an additional access plate 217 normally closing a transverse opening within an upper portion of the respective columns which plate 217 is removably secured in position by the fasteners 218. At the same time it is noted that the bottom plate 40 shown in FIGS. 14, 15, as well as FIG. 10 may be removed, as desired for access to the interior lower portion of the respective columns.

Having described my invention, reference should now be had to the following claims.

I claim:

1. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, a control bar secured upon the ground surface in fixed parallel spaced relation to one of said tracks, there being a series of longitudinally spaced apertures formed through said bar, a vertically reciprocal locking pin slidably mounted on one of said carriers normally spaced above said apertures, and manual control means pivotally mounted on a column and operatively joined to said pin for projecting the same selectively into one of said control bar apertures.

2. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, a control bar secured upon the ground surface in fixed parallel relation to each of said tracks, there being a series of longitudinally spaced apertures formed through said bars, a vertically reciprocal locking pin slidably mounted in each carrier spaced respectively above the apertures in a corresponding control bar, manual control means on each column joined to said pins respectively for movably projecting the same into one of said control bar apertures, and operating means in said top beam interconnecting said pins for rocking movement in unison to reciprocal movements of one pin, whereby activation of one of said manual control means and associated locking pin simultaneously operates the other manual control means and associated locking pin.

3. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, a control bar secured upon the ground surface in fixed parallel spaced relation to each of said tracks, there being a series of longitudinally spaced apertures formed through said bars, a vertically reciprocal locking pin slidably mounted in each carrier spaced respectively above the apertures in a corresponding control bar, a horizontally disposed rock shaft journaled within said top beam, rock plates secured on the opposite ends of said shaft, an upright link in each column, joined at its lower end to a locking pin and at its upper end pivotally joined to a rock plate, a manual control arm pivotally mounted on each column, and a control link pivotally joined at its lower end to a control arm and at its upper end pivotally connected to said rock plate, whereby one control arm is effective for raising and lowering both locking pins in unison.

4. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, the adjustable beam control means including an upright stationary screw secured at its ends within each column, a pinion supportably and rotatively mounted within each end of said adjustable beam and threaded over a stationary screw, rotative first gear means journaled within each end of the adjustable beam operatively and rotatively engaging said pinions respectively, second gear means in said adjustable beam interconnecting said first gear means for rotation in unison with said first gear means, and a rotative manual control selectively connected to one of said first gear means for simultaneous drive of both of said pinions.

5. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, a pair of aligned spaced pulleys, mounted within and adjacent each end of said top beam, a cable connected to each end of said adjustable beam extending upwardly over each pair of pulleys and downwardly into an adjacent column, a counterbalancing weight suspended from the free end of each cable, and guide means suspended from the ends of said top beam extending loosely through a weight and anchored at their lower ends within the corresponding column.

6. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, the adjustable beam control means including an upright stationary screw, secured at its ends within each column, a pinion supportably and rotatively mounted within each end of said adjustable beam and threaded over a stationary screw, manually rotative gear means on said vertically adjustable beam operatively and rotatively engaging said pinions respectively to effect raising and lowering of the adjustable beam, a pair of aligned spaced pulleys mounted within and adjacent each end of said top beam, a cable connected to each end of said adjustable beam extending upwardly over each pair of pulleys and downwardly into an adjacent column, and a counterbalancing weight suspended from the free end of each cable.

7. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, the mounting of said upright scale carriers on said adjustable beam including elongated horizontally disposed guide rods respectively mounted at their opposite ends above and below the adjacent beam, each scale carrier having a pair of vertically aligned apertured bosses slidably mounted on said guide rods respectively, a pair of aligned oppositely threaded shafts journaled on said adjustable beam, connected together and threadedly engaging a carrier respectively, and a turnwheel upon end portions of each of said shafts.

8. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, the mounting of said upright scale carriers on said adjustable beam including elongated horizontally disposed guide rods respectively mounted at their opposite ends above and below the adjacent beam, each scale carrier having a pair of vertically aligned apertured bosses slidably mounted on said guide rods respectively, a pair of aligned oppositely threaded shafts journaled on said adjustable beam, connected together and threadedly engaging a carrier respectively, and a turnwheel upon end portions of each of said shafts, the threaded engagement of said shafts with said scale carriers, including a boss on each carrier, a nut secured in said boss and threaded over a shaft, and a secondary nut within said boss threaded on said shaft and rotatively adjustable within said boss for taking up the slack.

9. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, the mounting of said upright scale carriers on said adjustable beam including elongated horizontally disposed guide rods respectively mounted at their opposite ends above and below the adjacent beam, each scale carrier having a pair of vertically aligned apertured bosses slidably mounted on said guide rods respectively, a pair of aligned oppositely threaded shafts journaled on said adjustable beam, connected together and threadedly engaging a carrier respectively, and a turnwheel upon end portions of each of said shafts, the connection between said oppositely threaded shafts including a recess in the end of one shaft and a shank extension on the other shaft nested in said recess, and a transverse pin extending through said shank and recessed portion of the other shaft.

10. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, and guide means on said vertically adjustable beam cooperatively engaging said columns, each of said columns in its inner upright surface having formed therein upright channels opening outwardly and of substantially rectangular cross section defining corresponding right angularly related guide surfaces, said guide means on said vertically adjustable beam including vertically apertured bosses projecting outwardly of the ends of the vertically adjustable beam movably mounted within said channels, and a series of rollers mounted on and projecting outwardly of said bosses corresponding to each of said column guide surfaces and cooperatively engaging the same.

11. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, there being upright outwardly opening channels formed along and within the interior portions of said columns, an upright screw positioned within each channel secured at its respective ends to portions of the adjacent column, bosses projecting outwardly from the respective ends of the vertically adjustable column apertured to slidably receive said screws respectively, said channels defining in the respective column a series of right angularly related guide surfaces, and rollers mounted on said bosses extending outwardly therefrom for cooperative engaging relation with each of said guide surfaces respectively.

12. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation, a scale pointer adjustably mounted on each scale carrier for symmetric gaging of exterior side and top surface portions of an object throughout its length, there being an upright outwardly opening channel formed within each of said columns upon its interior surface defining a series of right angularly related upright guide surfaces, the adjustable beam control means including an upright stationary screw nested within a column channel and secured at its ends to the corresponding column, a pinion supportably and rotatively mounted within each end of said adjustable beam and threaded over a stationary screw, manually rotative gear means on said vertically adjustable beam operatively and rotatively engaging said pinions respectively to effect raising and lowering of the adjustable beam, bosses projecting outwardly of the ends of said vertically adjustable column, and a series of rollers mounted on said bosses and extending outwardly therefrom cooperatively engageable with said column guide surfaces.

13. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other,
 a horizontally disposed vertically adjustable scale carrier mounted upon each column in opposed relation,
 a scale pointer adjustably mounted on each scale carrier for symmetric gaging of exterior side and top surface portions of an object throughout its length,
 there being outwardly opening channels formed upon the interior walls of each of said columns respectively, defining a series of angularly related guide surfaces, the adjustable beam control means including an upright stationary screw positioned within a channel and secured at its ends within a corresponding column, a pinion supportedly and rotatively mounted within each end of said adjustable beam and threaded over a stationary screw, manually rotative gear means on said vertically adjustable beam operatively and rotatively engaging said pinions respectively to effect raising and lowering of the adjustable beam, vertically aligned apertured bosses mounted and projecting outwardly of the respective outer ends of the vertically adjustable beam slidably mounted upon a corresponding screw, a series of right angularly related outwardly extending mounting arms projecting from the said bosses at opposite ends of the vertically adjustable beam, and rollers journalled upon the ends of said arms respectively engaging the said right angularly related guide surfaces within each column.

14. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other,
 a horizontally disposed vertically adjustable scale carrier mounted upon each column in opposed relation,
 a scale pointer adjustably mounted on each scale carrier for symmetric gaging of exterior side and top surface portions of an object throughout its length,
 there being an upright grooved guideway formed in one side of each of said columns, an upright centrally disposed dovetail guide within each guideway, the vertically adjustable scale carrier on each column including an upright base plate with its upright margins projecting into the column guideway, a pair of vertically spaced gibs secured to the rear surface of said carrier plate bearing against one edge of said dovetail guide, and a pair of vertically spaced tapered rollers journaled upon rear surface portions of said plate bearing against the opposite tapered edge of said guide for movably retaining said plate upon said column guide, and friction means retainingly engaging said guide for securing said scale carrier plate in vertically adjusted position upon said column.

15. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other,
 a horizontally disposed vertically adjustable scale carrier mounted upon each column in opposed relation,
 a scale pointer adjustably mounted on each scale carrier for symmetric gaging of exterior side and top surface portions of an object throughout its length,
 a centrally disposed upright dovetail guide upon the one side of each of said columns, the vertically adjustable scale carrier including an upright mounting plate in registry with said guide, a pair of spaced gibs on said plate cooperatively bearing against one edge of said guide, a pair of tapered rollers journaled upon the rear surface of said plate cooperatively bearing against the opposite edge of dovetail guide to facilitate vertical adjustment of said scale carrier upon said column, and friction locking means carried by said scale carrier plate operatively engageable with said dovetail guide for securing said scale carrier in vertically adjusted position upon said column.

16. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other,
 a horizontally disposed vertically adjustable scale carrier mounted upon each column in opposed relation,
 a scale pointer adjustably mounted on each scale carrier for symmetric gaging of exterior side and top surface portions of an object throughout its length,
 an upright dovetail guide upon a forward side of each of said columns, said vertically adjustable scale plate carrier registering with said guide, means on said scale plate carrier operatively engaging opposite edges of said guide for securing said vertically adjustable scale carrier upon said column, a pulley mounted within said top beam above a column, a cable secured to a central portion of said vertically adjustable scale carrier extending up over said pulley and downwardly into said column, and a weight secured to the lower end of said cable movably positioned within said column.

17. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation,
a scale pointer adjustably mounted on each scale carrier for symmetric gaging of exterior side and top surface portions of an object throughout its length,
an upright dovetail guide upon a forward side of each of said columns, said vertically adjustable scale plate carrier registering with said guide, means on said scale plate carrier operatively engaging opposite edges of said guide for securing said vertically adjustable scale carrier upon said column, a pulley mounted within said top beam above a column, a cable secured to a central portion of said vertically adjustable scale carrier extending up over said pulley and downwardly into said column, a weight secured to the lower end of said cable movably positioned within said column, and guide means extending longitudinally of the length of said column slidably received by said weight, said guide means secured at their upper ends to an upper portion of said column and anchored at the lower ends within a lower portion of said column.

18. In a three-dimensional checking fixture adapted for mounting upon a pair of spaced tracks on a ground surface: a pair of upright columns, a carrier movably mounting each column and including a pair of aligned wheels movably mounted upon a track, a top beam spanning and at its respective ends mounted over and secured upon said columns, a horizontally disposed beam below said top beam and at its respective ends mounted upon said columns for vertical adjustments therebetween, control means on said adjustable beam operatively engaging said columns for raising and lowering the adjustable beam, a pair of spaced upright scale carriers slidably mounted on said adjustable beam and adapted for movement in unison toward and away from each other, a horizontally disposed vertically adjustable scale carrier mounted upon each column in opposed relation,
a scale pointer adjustably mounted on each scale carrier for symmetric gaging of exterior side and top surface portions of an object throughout its length,
an upright centrally disposed guide mounted upon an outer surface on each of said columns, said vertically adjustable scale carriers each including an upright mounting plate, retaining means secured to said plate and operatively and retainingly engaging opposite edges of said guide, manual control friction means upon the rear surface of said plate operatively and frictionally engageable with one edge of said guide for securing said plate in vertically adjusted position, and a plurality of vertically spaced transversely extending slotted supports projecting forwardly of said plate, said scale pointer being selectively positionable within one of said slotted supports and longitudinally adjustable therein.

References Cited in the file of this patent

UNITED STATES PATENTS

| | | |
|---|---|---|
| 1,292,121 | Stead | Jan. 21, 1919 |
| 1,949,007 | Butler | Feb. 27, 1934 |
| 2,048,989 | Haribean | July 28, 1936 |
| 2,136,134 | Holley | Nov. 8, 1938 |
| 2,305,167 | Kasper | Dec. 15, 1942 |
| 2,341,176 | Buehrig | Feb. 8, 1944 |
| 2,495,891 | Davis | Jan. 31, 1950 |

FOREIGN PATENTS

| | | |
|---|---|---|
| 524,405 | Great Britain | Aug. 6, 1940 |